United States Patent
Marquiz

(10) Patent No.: US 7,454,606 B2
(45) Date of Patent: Nov. 18, 2008

(54) MAINTENANCE DEVICE FOR REMOTELY ACCESSING AND REPAIRING FAILED COMPUTER SYSTEMS

(75) Inventor: Joseph D. Marquiz, Lake Forest, CA (US)

(73) Assignee: Incharge Technology, Inc., Encino, CA (US)

(*) Notice: Subject to any disclaimer, the term of this patent is extended or adjusted under 35 U.S.C. 154(b) by 319 days.

(21) Appl. No.: 11/138,614

(22) Filed: May 26, 2005

(65) Prior Publication Data

US 2006/0271773 A1 Nov. 30, 2006

(51) Int. Cl.
G06F 9/24 (2006.01)
G06F 11/07 (2006.01)

(52) U.S. Cl. ............... 713/1; 713/100; 714/4; 714/38

(58) Field of Classification Search ......... 713/2, 713/1, 100; 714/23, 31, 36, 46, 4, 38
See application file for complete search history.

(56) References Cited

U.S. PATENT DOCUMENTS

| | | | |
|---|---|---|---|
| 5,732,268 A | 3/1998 | Bizzarri | |
| 6,651,190 B1 | 11/2003 | Worley et al. | |
| 6,807,643 B2* | 10/2004 | Eckardt et al. | 714/36 |
| 6,826,707 B1* | 11/2004 | Stevens | 714/2 |
| 2006/0020837 A1* | 1/2006 | Rothman et al. | 713/310 |

* cited by examiner

Primary Examiner—Thuan N Du
(74) Attorney, Agent, or Firm—Thomas I. Rozsa

(57) ABSTRACT

A software and hardware driven CRASH REPAIR BOX allows a local computer to be diagnosed and repaired from a remote computer location. The CRASH REPAIR BOX is particularly useful in situations where the local host computer has failed to properly BOOT. Using a memory and memory controller, software for a particular user platform, such as WINDOWS XP™ or WINDOWS 2000™, will be loaded from the remote computer into the CRASH REPAIR BOX and stored in the memory. The BIOS in the local host computer is then reconfigured to BOOT from the memory in the CRASH REPAIR BOX. Thus, utilizing the platform software stored in the memory of the CRASH REPAIR BOX, the local host computer will be able to properly and fully BOOT. Once the local host computer is able to fully BOOT from the software stored in the memory, further diagnostics and repairs can then be conducted.

9 Claims, 4 Drawing Sheets

MAINTENANCE DEVICE FOR REMOTELY ACCESSING AND REPAIRING FAILED COMPUTER SYSTEMS

FIELD OF THE INVENTION

The invention relates generally to the field of remote management of computer systems. More particularly, the invention relates to the field of remotely accessing and repairing a failed computer system using a separate and independent maintenance device and a remote computer.

BACKGROUND OF THE INVENTION

Almost every business organization is dependent upon computers for the management of import data including accounting, inventory, and/or customer information. Often these computers must be accessible twenty four hours a day. It is not uncommon for companies to employ a technician off site to manage and maintain their computer system. If a computer crashes or experiences a system failure, the company will contact the off-site technician and he/she will then visit the company and try to fix the computer.

Wide scale proliferation of home computer usage is also very common in this modern day and age. Nearly every household has a personal computer, with some having more than one. Users may use their personal computers for word processing, home financial accounting, or even simple Internet surfing. Unfortunately, personal home computer user's usually do not employ off-site technicians to manage and maintain their computer system. Accordingly, when their home based computer system crashes, they must often take the computer to a retail/repair shop in order to have a technician diagnose and/or test the problem and repair the computer.

A computer crash is a failure of the computer to either BOOT properly or a software error which may occur when running a program. The first type of crash is typically more serious and may altogether prevent a computer from operating. Whenever you turn on your computer, the first thing you see is the BIOS software doing its thing. On many machines, the BIOS displays text describing things like the amount of memory installed in your computer, the type of hard disk, the space available, and so on. It turns out that, during this boot sequence, the BIOS is doing a remarkable amount of work to get your computer ready to run. After checking the CMOS Setup and loading the interrupt handlers, the BIOS determines whether there is an operational video card. Most video cards have a miniature BIOS (mini-BIOS) of their own that initializes a local memory and graphics processor resident on the video card. If the video card does not have its own mini-BIOS, there is usually video driver information located on another Read Only Memory (ROM) on the motherboard that the BIOS can load.

Next, the BIOS checks to see if this is a cold boot or a reboot. It does this by checking the value at a particular memory address location on the local hard drive, usually memory address location 0000:0472. A value of 1234h in this memory address location indicates a reboot. Any other value, such as 0000h, indicates a clean start-up or cold boot. If it is a cold boot, the BIOS verifies RAM by performing a read/write test of each memory address. The BIOS then checks the PS/2 ports or USB ports for a keyboard and a mouse. It looks for any peripheral component interconnect (PCI) bus and, if the BIOS finds one, it then checks all the PCI cards coupled to the PCI bus. During this process, if the BIOS finds any errors, it will notify a user by a series of beeps or a text message displayed on the screen. An error at this point is almost always a hardware problem.

Assuming there have been no hardware errors at this point in time, the BIOS then displays some details about the local computer system. This typically includes information about the type of display coupled to the local computer, information about the type of processor, information about any existent floppy drive, information about any hard drive (including information on the amount of available memory), and information about the BIOS version/revision and date of the version/revision. After displaying this information, any special drivers, such as the ones for small computer system interface (SCSI) adapters, are then loaded, and the BIOS displays the information relevant to each of these drivers.

Once the BIOS has recognized and configured/initiated all of the devices, the BIOS then looks at the sequence of storage devices identified as possible BOOT devices in the CMOS Setup. The term BOOT refers to the process of launching an operating system on the local host computer. The BIOS will try to initiate a BOOT sequence from the first device identified in the CMOS Setup. If the BIOS does not find the device, it will try the next device in the list, and so on. If the BIOS does find the device, it will attempt to BOOT from the device. In most instances, the BIOS will be directed to a specific area on a local hard drive where the system will find the proper files for BOOTING UP the operating system on the local host computer. If the BIOS does not find any BOOT device and/or does not find the proper files on any device, the BOOT process will halt. If the BOOT process halts, the computer may flash an error message and will typically display what is commonly referred to as "the blue screen of death", which is simply a completely blue screen shown on the monitor/display coupled to the local host computer.

Software does exist which allows for some remote operation and diagnosis of computers such that some repairs may be performed on a local host computer without having to take the computer into a retail/repair outlet. For example, Microsoft® NetMeeting® allows technicians who are highly trained with computer repairs, both hardware and software, to remotely connect to a local host computer running on one of Microsoft's platforms/operating systems (i.e. WINDOWS 2000® or WINDOWS XP®). Utilizing the Microsoft® NetMeeting®, the technician can remotely access and control the local host computer in order to diagnose and attempt to repair a computer problem from a remote location.

The only problem with these types of software devices is that they will only work so long as the operating system is able to run and the local host computer is able to connect to the network. If the local host computer is unable to fully and completely boot, then it cannot connect to the network and the software will not work.

U.S. Pat. No. 5,732,268 issued to Bizzarri (hereinafter referred to as "the '268 Patent") discloses an extended basic input and output system (E-BIOS) which includes code for sensing when a computer does not boot properly. More specifically, Bizzarri teaches that if a computer does not boot properly, a second portion of the code, known as E-BIOS, directs the local host computer to establish communication with a remote diagnostics and repair computer. Once communication is established a master code kernel on the remote computer downloads a slave kernel to the random access memory (RAM) of the local computer, allowing an operator at the diagnostics and repair computer to access and modify code and data in the memory devices of the local host computer.

There are several limitations to the '268 Patent. First, the software for the extended bios (E-BIOS) is resident on the local host computer and, therefore, in order for the local host computer to execute the E-BIOS software, the computer must, at the very least be sufficiently operable for executing the software. Additionally, the local computer must be sufficiently operable in order to communicate with the remote computer over an established communications link. Accordingly, in a situation where the boot error is severe and the local host computer is totally inoperable, and unable to BOOT at all, then the E-BIOS solution proposed by the '268 Patent will not work.

Additionally, BIOS is hardware specific. Accordingly, a solution which utilizes a pre-loaded E-BIOS requires that the software be specifically tailored to the specific users computer and the system in which it is utilized. Thus, software must be customized for each user and loaded into the user's computer. If the system changes, if additional or new peripherals are utilized, then the E-BIOS must be updated or it will not function properly.

Finally, in the '268 Patent, the slave kernel is downloaded to the RAM of the host compute. In a total system crash where the only option is a reboot, this solution will not work because the RAM of the host computer will be instantly cleared upon reboot and the slave kernel software will be lost. Accordingly, as described earlier, this solution will only work where the local host computer is, at the very least, operable and able to execute the software of the slave kernel before any reboot.

Similarly, U.S. Pat. No. 6,651,190 issued to Worley, et al. (hereinafter referred to as "the '190 Patent") discloses a remote maintenance device for monitoring and controlling a host computer and its operating system. The device includes a microprocessor which connects to the host computer and a wireless connection to the Internet which connects the device to a remote computer. In short, the microprocessor receives status data bout the present state of the host computer and transmits this data to a remote computer via the wireless connection. The remote computer can then send serial commands back to the device in order to further analyze and control the host computer.

While the device of the '190 Patent is itself wholly separate from the computer and can be used to diagnose many technical problems, the device in the '190 Patent does not teach any method for recovery of a Boot error. More specifically, if the host computer does not boot properly and displays the "blue screen of death", the '190 Patent teaches that this problem can be diagnosed or detected; but, short of technician intervention, the '190 Patent does not disclose any method for remedying this situation.

In summary, all of these previously designed solutions for remote diagnosis and repair of local host computers are highly dependent upon the operability of the host computer. If the host computer is completely non-operational, the ability of the proposed solution to actually both diagnose and repair any problem is severely limited. Accordingly, what is needed is a device for remote diagnostic and repair which is particularly useful in situations where the local host computer has failed to properly BOOT (or REBOOT), and is completely non-operational, displaying the "blue screen of death".

What is further needed is a device which will work with any type of hardware/computer setup and which is compatible with multiple operating systems such that there is no need to modify a user's computer in order to use the device to remotely diagnose and repair any BOOT problems or errors.

SUMMARY OF THE INVENTION

The invention is directed toward a software and hardware driven CRASH REPAIR BOX which is integrated into an existing computer system such that a local computer may be diagnosed and repaired from a remote computer location without the need for a technician to be present at the host computer's location. In previously designed solutions for remote diagnosis and repair of local host computers, the solution is highly dependent upon the operability of the host computer. If the host computer is completely non-operational, the ability of the solution to both diagnose and repair the problems is severely limited. Accordingly, the CRASH REPAIR BOX of the present invention is particularly useful in situations where the local host computer has failed to properly boot and/or reboot properly, displaying the "blue screen of death".

Preferably, any number of peripherals, including a display, a mouse, and a keyboard may be coupled to the local host computer via the CRASH REPAIR BOX of the present invention. When the CRASH REPAIR BOX is not in operation, the signals to/from the keyboard, mouse, and display simply pass through the CRASH REPAIR BOX, to/from the local host computer. In this way, when the CRASH REPAIR BOX is not in operation the peripherals act as if coupled directly to the local host computer and the presence of the CRASH REPAIR BOX is non-detectable/non-discernable to the local host computer. However, when the CRASH REPAIR BOX is operational, the CRASH REPAIR BOX initiates direct control over these peripherals and an operator present at the remote computer location can test, monitor and control operations of these peripherals in order to ascertain whether they are working properly and detect any problems.

In a preferred embodiment, the CRASH REPAIR BOX of the present invention will also include Broadcom capabilities and input/output ports for connecting to the remote computer location and communicating with the remote computer location via the Internet. A network card and auto dialer within the CRASH REPAIR BOX are configured to dial to a specific remote IP address, allowing the CRASH REPAIR BOX to communicate with the remote computer located at such IP address.

The CRASH REPAIR BOX will also preferably include built-in voice-over-Internet capabilities along with a speaker and microphone, thereby allowing voice communications with an operator located at the remote computer location. When a service call is initiated, the voice-over Internet capabilities are initiated and a user at the local host computer may use the built-in speaker and microphone to communicate with a live operator located at the remote computer location without having to make a separate phone call.

The CRASH REPAIR BOX of the present invention further includes memory and a memory controller, for controlling read/write operations to and from the memory. In operation, software for a particular user platform, such as WINDOWS XP™ or WINDOWS 2000™, will be loaded from the remote computer into the CRASH REPAIR BOX and stored in the memory. It is understood that WINDOWS XP™ is only one example of the platform on which the current invention may be utilized and, in fact, it may be used to load BIOS for anyone of multiple available operating systems including Mac OS, UNIX LINUX, WINDOWS, and/or any SUN operating systems.

After the proper BIOS for the particular user operating system has been loaded in tot the CRASH REPAIR BOX, the BIOS in the local host computer is then reconfigured to BOOT from the memory in the CRASH REPAIR BOX.

Thereafter, utilizing the platform software stored in the memory of the CRASH REPAIR BOX, the local host computer will be able to properly and fully BOOT. Once the local host computer is able to fully BOOT from the software stored in the memory and is fully operational, further diagnostics and repairs can then be conducted utilizing the CRASH REPAIR BOX of the present invention.

Finally, the CRASH REPAIR BOX of the present invention is designed to work with any type of hardware/computer setup and is compatible with multiple operating systems such that there is no need to modify a user's computer in order to use the device to remotely diagnose and repair any BOOT problems or errors.

DETAILED DESCRIPTION OF PREFERRED EMBODIMENTS

Reference will now be made to the drawings in order to describe preferred and alternate embodiments of the invention, in which the various elements of the present invention will be given numerical designations. It is to be understood that the following description is only exemplary of certain preferred embodiments of the present invention and alternate embodiments are feasible.

System Overview

Figure 1:
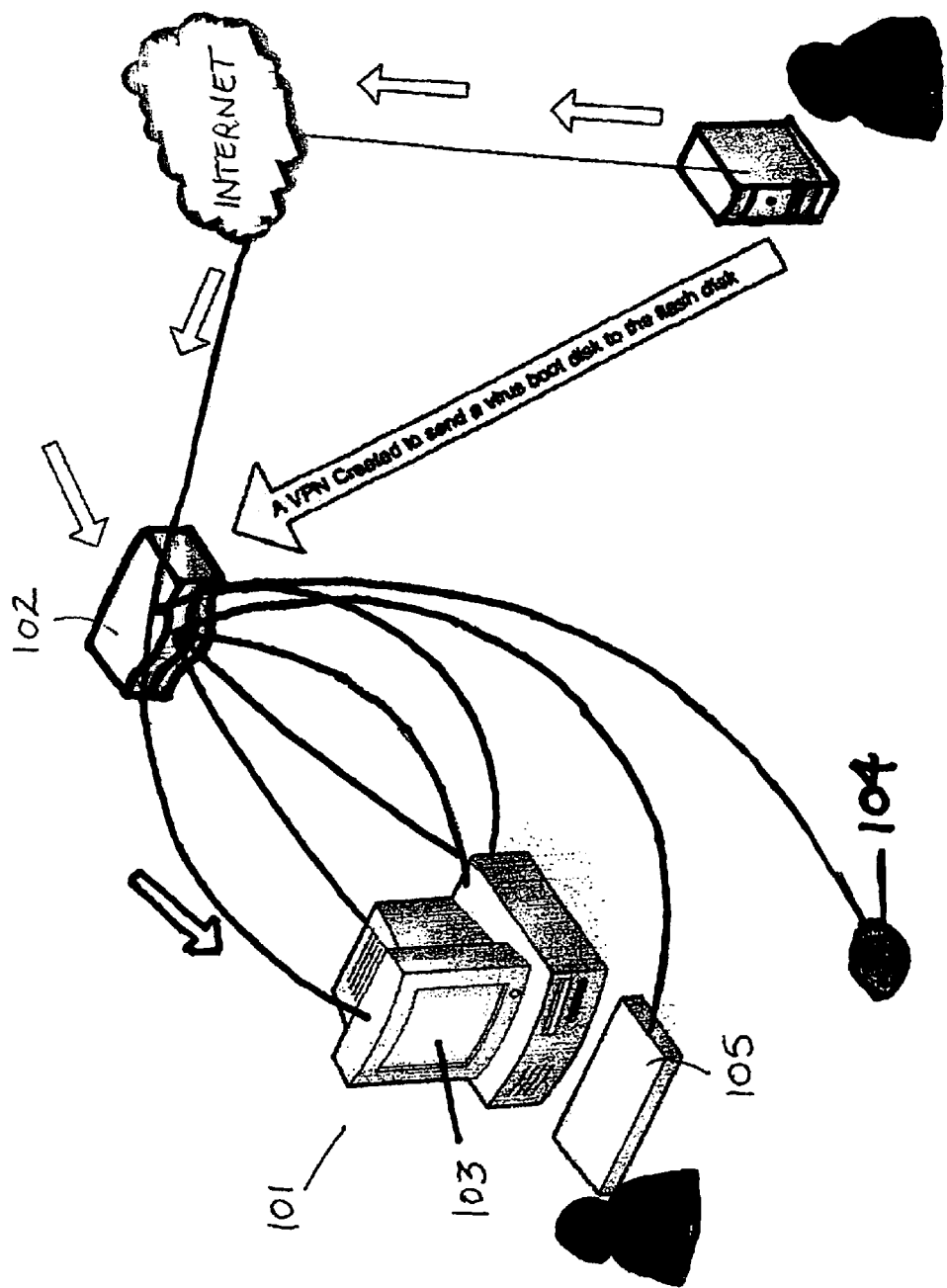
FIG. 1 illustrates a preferred embodiment of a computer system in which a preferred embodiment of the CRASH REPAIR BOX of the present invention is fully integrated for use in diagnosing and repairing a local computer from a remote location.

FIG. 1 illustrates a preferred embodiment of a computer system in which the CRASH REPAIR BOX of the present invention is fully integrated for use in controlling, diagnosing and repairing a local host computer from a remote computer location. As shown in FIG. 1, the system includes a local host computer 101. A CRASH REPAIR BOX 102, in accordance with a preferred embodiment of the present invention, as later described hereinafter, is coupled to the host computer 101. Any number of peripherals, including a display 103, a mouse 104, and a keyboard 105 are all coupled to the computer 101 via the CRASH REPAIR BOX 102 of the present invention. Accordingly, the peripherals are actually coupled to the CRASH REPAIR BOX 102. When the CRASH REPAIR BOX is not in operation, the signals to/from the keyboard 105, mouse 104, and display 103 simply pass through the CRASH REPAIR BOX, to/from the local host computer. In this way, when the CRASH REPAIR BOX is not in operation the peripherals act as if coupled directly to the local host computer and the presence of the CRASH REPAIR BOX is non-detectable/non-discernable to the local host computer 101.

The CRASH REPAIR BOX 102 is further coupled to the Internet via high speed broadband communications. When the CRASH REPAIR BOX is non-active, the connection with the Internet is inactive. However, when the CRASH REPAIR BOX is activated, the connection to the Internet is initiated. The CRASH REPAIR BOX will also preferably include built-in voice-over-Internet capabilities along with a speaker and microphone, thereby allowing voice communications over the high speed broadband Internet connection.

As further shown in FIG. 1, a remote computer is also coupled to the Internet via a high speed DSL or cable modem connection, or any other high speed type of broadband connection, such as a T1 line. Accordingly, the remote computer is coupled to the Internet and able to be in direct contact with the CRASH REPAIR BOX and the local host computer when CRASH REPAIR BOX is activated. Moreover, as described earlier, voice-over-Internet capabilities in the CRASH REPAIR BOX allow a user at the local host computer to communicate with an operator located at the remote computer location. Accordingly, when the CRASH REPAIR BOX is activated, the voice-over Internet capabilities are initiated and a user at the local host computer may communicate with a live operator located at the remote computer location without having to make a separate phone call.

Structural Overview

Figure 2:
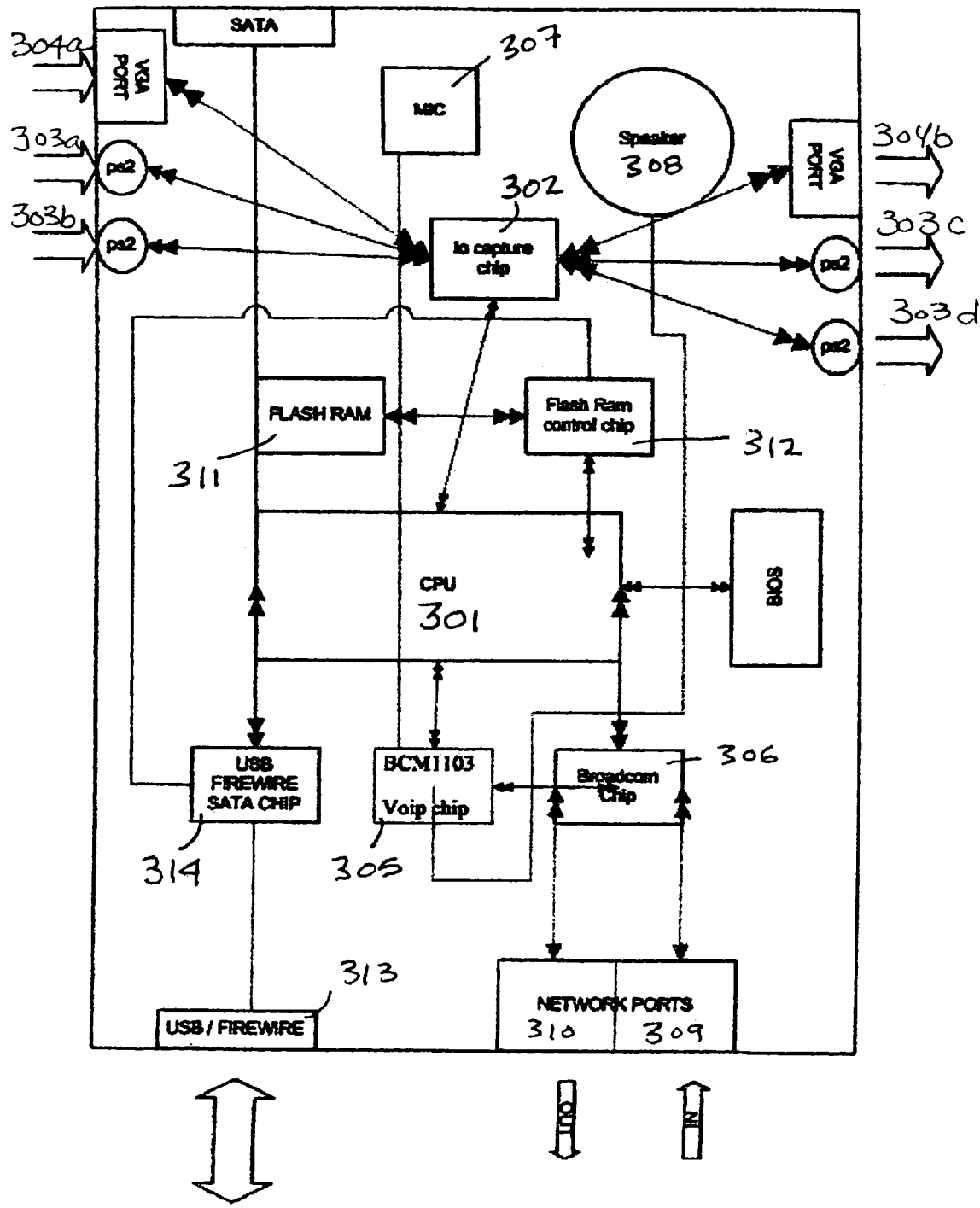
FIG. 2 illustrates a preferred embodiment of the structural components of the CRASH REPAIR BOX of the present invention.

FIG. 2 illustrates a preferred embodiment of the structural components of a CRASH REPAIR BOX in accordance with a preferred embodiment of the present invention. As shown, the CRASH REPAIR BOX preferably includes a microprocessor/CPU 301. The microprocessor/CPU controls operations of the CRASH REPAIR BOX and communications between the CRASH REPAIR BOX and the local host computer, as well as communications between the CRASH REPAIR BOX and the remote computer.

The CRASH REPAIR BOX further includes an I/O Capture Chip 302 coupled to the microprocessor/CPU 301 and several PS2 input/output ports 303a-d and at least on set of VGA input/output ports 304a-b coupled to the I/O Capture Chip 302. The at least one set of VGA input/output ports 304a-b are where any monitors/CRTs/flat panel displays are coupled to the local host computer via the CRASH REPAIR BOX and the PS2 input/output ports are where any keyboards or mice may be coupled to the local host computer via the CRASH REPAIR BOX. More specifically, a monitor/CRT/flat panel display may be coupled to local host computer through the VGA input/output ports of the CRASH REPAIR BOX. Similarly, keyboards, mice or even trackballs may also be coupled to the local host computer though the PS2 input/output ports of the CRASH REPAIR BOX As described earlier herein, any number of peripherals, including a display, a mouse, and a keyboard may be coupled to the computer via the CRASH REPAIR BOX of the present invention. When the CRASH REPAIR BOX is not in operation, the signals to/from the keyboard, mouse, and display simply pass through their respective ports, through the I/O Capture Chip and the microprocessor/CPU, and to/from the local host computer to which the CRASH REPAIR BOX is coupled. In this way, when the CRASH REPAIR BOX is not in operation the peripherals act as if coupled directly to the local host computer and the presence of the CRASH REPAIR BOX is non-detectable/non-discernable to the local host computer. When the CRASH REPAIR BOX is operational, the microprocessor/CPU and I/O Capture Chip 302 allow a technician located at the remote computer location to route the I/O signals to and from the peripherals from the CRASH REPAIR BOX to the remote computer location such that a technician located at the remote computer location may take control of and monitor these various peripherals, as described further hereinafter.

As further shown in FIG. 2, the CRASH REPAIR BOX preferably includes a Voice Over Internet Chip 305 coupled to the microprocessor/CPU 301, a Broadcom Chip 306 coupled to both the Voice Over Internet Chip 305 and the microprocessor/CPU 301, a Microphone 307 coupled to the Voice Over Internet Chip 305 and a Speaker 308 coupled to the Voice Over Internet Chip 305. As explained earlier, the CRASH REPAIR BOX will preferably include built-in voice-over-Internet capabilities (i.e. the Voice Over Internet Chip 305) along with a speaker 308 and microphone 307, thereby allowing voice communications with an operator located at the remote computer. When a service call is initiated, the voice-over Internet capabilities are initiated and a user at the local host computer may use the built-in speaker and microphone to communicate with a live operator located at the remote computer location without having to make a separate phone call.

Referring still to FIG. 2, the CRASH REPAIR BOX of the present invention also preferably includes an Input Network Port 309 and an Output Network Port 310, both of which are coupled to the Broadcom Chip 306. These ports are coupled to communications lines which are used to communicate with the remote computer over the Internet. They allow for and provide both data and voice-over-internet communications between the remote computer and the CRASH REPAIR BOX when the CRASH REPAIR BOX is activated and fully operational.

The CRASH REPAIR BOX of the present invention further includes a Memory Chip 311, such as a Flash RAM or EEPROM, and a Memory Controller 312 (for controlling read/write operations to and from the Memory Chip) coupled between the Memory Chip 311 and the microprocessor/CPU 301. The Memory Chip 311 may be used to store various maintenance and diagnostic programs which may be downloaded to the Memory Chip 311 from the remote computer, as needed. For example, as will be described further hereinafter, when a CRASH REPAIR BOX of the present invention is activated and used to diagnose and fix a BOOT operation failure (i.e. to diagnose and fix a "blue screen of death), software for any particular user platform, such as WINDOWS XP or WINDOWS 2000, is loaded from the remote computer into the CRASH REPAIR BOX and stored in the Memory Chip 311. The BIOS in the local host computer will then be reconfigured to BOOT from the Memory Chip 311 in the CRASH REPAIR BOX. Thus, utilizing the platform software stored in the Memory Chip 311, the local host computer will be able to properly and fully-BOOT. As will also be described in more detail further hereinafter, once the local host computer is able to fully BOOT from the software stored in the Memory Chip 311 and is fully operational, further diagnostics and repairs can then be conducted utilizing the CRASH REPAIR BOX of the present invention.

The CRASH REPAIR BOX of the present invention also preferably includes a USB/Firewire Port 313 coupled to the microprocessor/CPU 310. This port is for coupling the CRASH REPAIR BOX to the local host computer such that data and information may be transferred to/from the host computer at high speeds. The CRASH REPAIR BOX will also preferably include a USB to Serial ATA bridge 314 coupled between the USB/Firewire Port 313 and the Memory Controller 312. Use of this USB to Serial ATA bridge 314 allows for high speed reading and writing of large volumes of data to and from the Memory Chip 311 using an ATA bus. The USB to Serial ATA bridge 314 and the USB/Firewire Port 313 allow the CRASH REPAIR BOX to be used with computers having USB port configurations for data transfer.

Over time, however, the standard will presumably improve and more computers will be configured with Serial ATA bus lines and communication ports because Serial ATA is more efficient then previously used IDE parallel communications. More specifically, Serial ATA wraps many bits of data into a packet and then, at a higher speed (up to 50% higher) than parallel, transfers the packet of data down the wire to or from the host computer. In addition to a faster, more reliable bus, Serial ATA improves cabling and connectors for a robust yet simpler integration. Serial ATA cables are thinner and longer for improved system airflow and innovative system designs such as small form factor and consumer electronic boxes. Accordingly, as more computers move toward ATA, the CRASH REPAIR BOX will also preferably be equipped with a Serial ATA port 314, in which case the CRASH REPAIR BOX can be coupled to the local host computer through this port and data transfers to and from the local host computer can be accomplished directly without the need for the USB to Serial ATA bridge 314.

Functional Overview

Figure 3A:
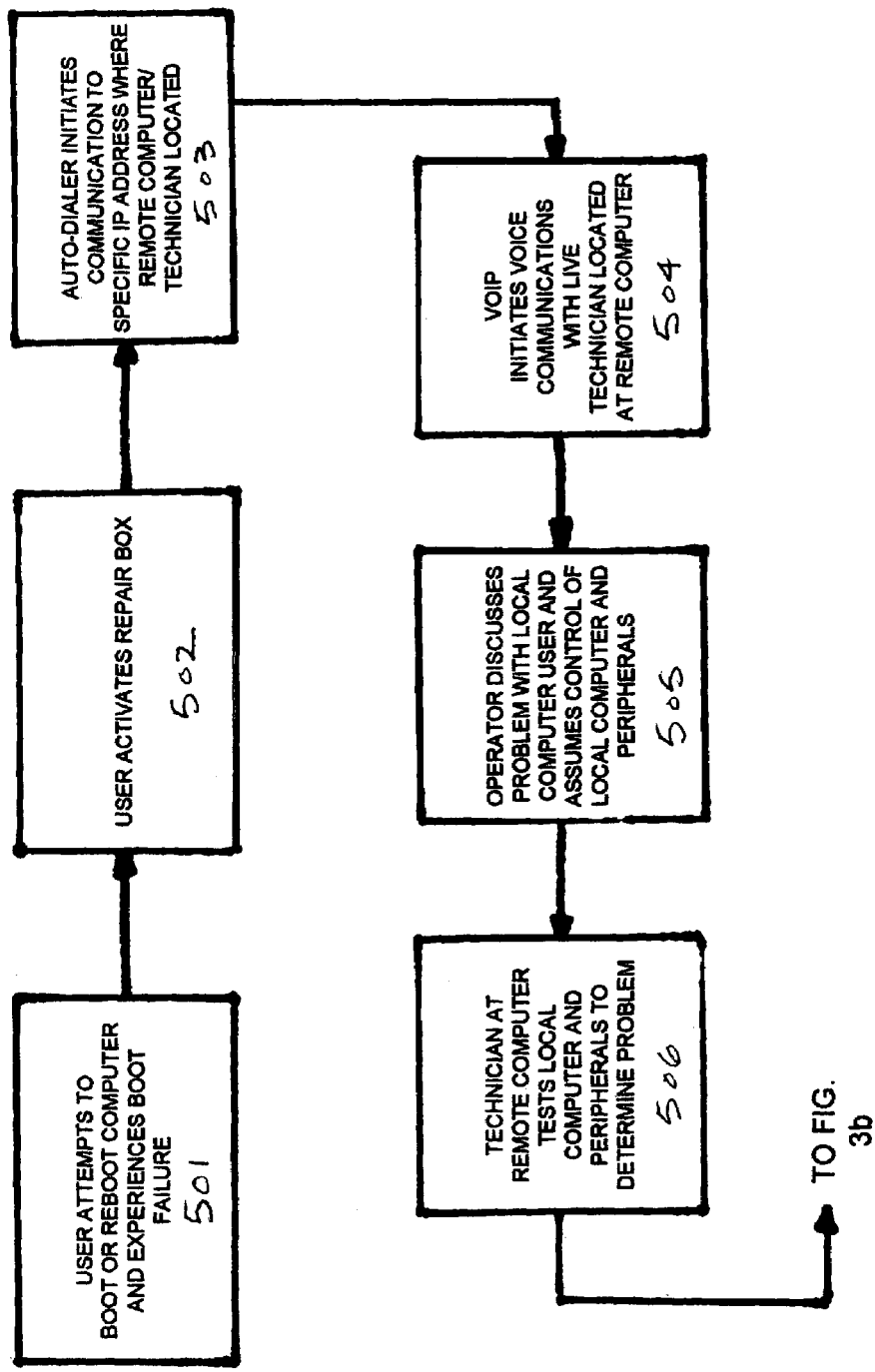
FIGS. 3a-3b illustrate a flow chart which describes the overall functional operation of a computer system in which the CRASH REPAIR BOX of the present invention is fully integrated, in accordance with a preferred embodiment of the present invention.
Figure 3B:
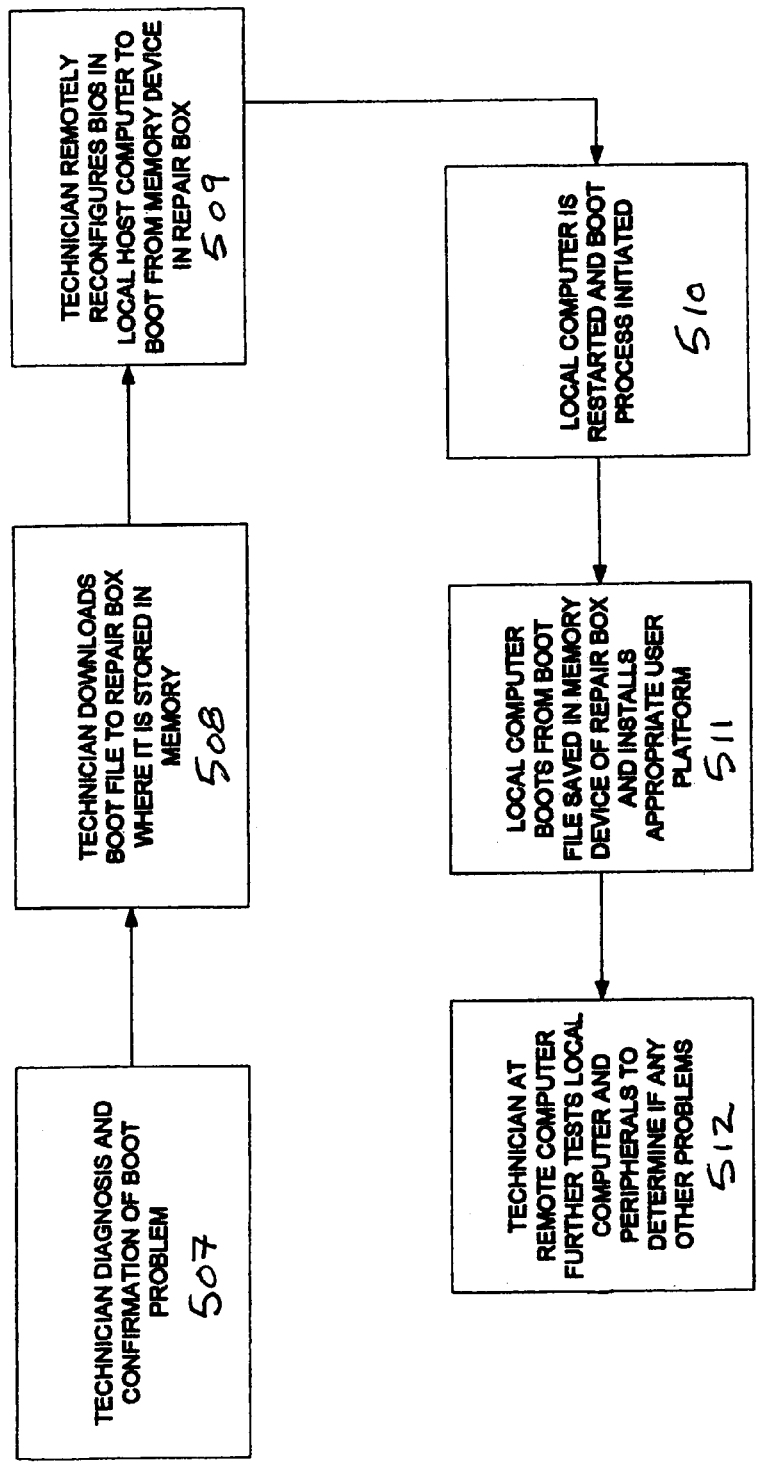

FIGS. 3a-3b illustrates a flow chart which describes the overall functional operation of the previously described system in accordance with a preferred embodiment of the present invention. As explained earlier, the CRASH REPAIR BOX of the present invention is ideal for use in situations where there has been a total BOOT operation failure. Accordingly, and referring to FIG. 3a, prior to any activation of the CRASH REPAIR BOX a user will first attempt to turn on or restart his/her own personal computer (the local host computer) 501. The computer will fail to complete the BOOT operation and the user will encounter what is commonly referred to as the "blue screen of death", meaning that the computer has not BOOTED up properly and is therefore inoperable, displaying nothing but a blue screen on the video monitor. When this occurs, the user will activate the CRASH REPAIR BOX of the present invention by pressing an activation button located on the CRASH REPAIR BOX 502. The CRASH REPAIR BOX is then operational.

When the CRASH REPAIR BOX becomes operational, a Broadcom Chip 306 and an auto dialer configured within the CRASH REPAIR BOX are automatically activated. In a preferred embodiment, the auto dialer is configured to dial to a specific remote IP address where a remote computer and technician are located, allowing the CRASH REPAIR BOX to communicate with the remote computer located at such address 503. The Broadcom Chip 306 will initiate communications via the Outbound Network Port 310 and the CRASH REPAIR BOX will attempt to contact the remote computer via the Internet.

Once a connection is established, the remote computer will query the CRASH REPAIR BOX in order to ascertain the ID of the computer/user calling in for service. Preferably, each CRASH REPAIR BOX is configured with its own internal ID or serial number. When a user first purchases a CRASH REPAIR BOX and sets it up for future operation, he will contact the remote computer and the ID or serial number of the CRASH REPAIR BOX is retrieved from the CRASH REPAIR BOX and stored on the remote computer, along with the identity of that particular user. Accordingly, when the CRASH REPAIR BOX makes an actual call in for service to the remote computer location, the ID or serial number of the BOX is identified and the particular user is also identified. The service call is then routed to a live operator (present at the same location where the remote computer is located).

As described earlier, the CRASH REPAIR BOX will preferably include built in voice-over-Internet capabilities with a speaker and microphone, thereby allowing voice communications with an operator located at the remote computer. When a service call is initiated, the voice-over Internet capabilities are initiated and a user at the local host computer may use the built-in speaker and microphone to communicate with a live operator located at the remote computer location without having to make a separate phone call 504.

When the service call is routed to the live operator, the operator will preferably identify himself and provide a brief greeting to the user letting the user know that the operator has received the call. Using the built-in speaker, microphone and Voice Over Internet Chip 305, the user and live operator can communicate back and forth such that the user can describe the problem to the live operator and the operate can ask questions of the user regarding any basic trouble shooting the user may have already conducted (i.e. whether the user has tried to turn the computer off and on in order to attempt a reboot). The operator will then inform the user that he/she is going to take control of the user's computer 505.

The operator will then utilize software resident on the remote computer and the CRASH REPAIR BOX in order to establish communications and control of each of the individual hardware devices associated with the user's computer. The remote operator will send a command to the CRASH REPAIR BOX in order to initialize the box and initiate a software switch in order to route signals to/from the each of the individual hardware devices to the remote computer. The CRASH REPAIR BOX will preferably use the ITU T.120 family of protocols for communicating with and assuming control of the individual hardware devices.

As explained earlier, in a computer system including the CRASH REPAIR BOX of the present invention, each individual hardware device associated with the user's computer (i.e. the screen/monitor, the mouse, the keyboard, the printer, and any other devices) is coupled to the user's computer through the CRASH REPAIR BOX. Using the CRASH REPAIR BOX, the live operator will be able to see if each individual hardware device is operating properly or if a failure in communication with one of the devices may be the source of the inability to properly boot 506. If the live operator/technician determines that each of the individual hardware devices is fully operational and operating properly, he/she will then attempt to reboot the local host computer. Preferably this will be done remotely or, alternatively, the operator/technician may simply instruct the user (using the voice over Internet capabilities and speaker/microphone of the CRASH REPAIR BOX) to restart the local host computer. The operator can then observe the BOOT process (as he/she now has control of the video monitor) and diagnose/confirm the BOOT problem 507. Once the live operator has diagnosed and confirmed a problem with the BOOT process, he can then set about correct this BOOT error.

First, the operator will preferably download/transfer a clean and valid boot file to the memory device resident within the CRASH REPAIR BOX 508. It is understood that the clean and valid boot file may be associated with any platform currently utilized by the user and there are no limits on the type or size of boot file which may be downloaded to the CRASH REPAIR BOX (preferably the memory device resident within the CRASH REPAIR BOX is designed to ensure enough space to accommodate such boot file transfer). Thus, for example, if the user's local host computer is normally configured to run on the WINDOWS XP platform, a clean boot file for loading the WINDOWS XP platform will be transferred from the remote computer to the CRASH REPAIR BOX and stored in the Memory Chip 311 of the CRASH REPAIR BOX. Using the CRASH REPAIR BOX and the remote computer, the technician at the remote computer will then reconfigure the CMOS setup in the local host computer to BOOT from the Memory Chip in the CRASH REPAIR BOX 509.

More specifically, the remote technician will reboot the local computer and hit a "hot key" such as the DELETE button, in order to interrupt the reboot process. The local system will then display its local CMOS setup. The remote technician then edits the local CMOS setup and selects the Memory Chip in the CRASH REPAIR BOX as the proper boot device. The remote technician accepts the changes and the local computer will then reboot once again 510. This time, however, the remote technician does not interrupt the boot process.

This time the BIOS will look at the sequence of storage devices identified as possible BOOT devices. In this instance, the sequence of storage devices has been edited to identify the Memory Chip in the CRASH REPAIR BOX as the BOOT device. The BIOS in the local computer will then try to initiate the BOOT sequence from the Memory Chip 311 in the CRASH REPAIR BOX and will perform the necessary steps needed to properly complete the BOOT operation. More specifically, the local computer will recognize any type of boot file (usually by its file name/extension) stored on the Memory Chip of the CRASH REPAIR BOX and will then execute that file in order to complete the process 511.

Thus, for example, if the user's local host computer is normally configured to run on the WINDOWS XP platform and a clean boot file for loading the WINDOWS XP platform has been stored in the Memory Chip 311 of the CRASH REPAIR BOX then the BIOS in the local computer will initiate the BOOT sequence and download this boot file from the Memory Chip 311 in the CRASH REPAIR BOX, completing the boot-up of the WDOWS XP platform on the local host computer. Thus, utilizing the platform software stored in the Memory Chip, the local host computer will be able to properly and fully BOOT. It is understood that WINDOWS XP™ is only one example of the platform on which the current invention may be utilized and, in fact, it may be used to load BIOS for anyone of multiple available operating systems including Mac OS, UNIX, LINUX WINDOWS, and/or any SUN operating systems.

Once the local host computer is able to fully BOOT from the software stored in the Memory Chip 311 and is fully operational, further diagnostics and repairs can then be conducted utilizing the CRASH REPAIR BOX of the present invention 512. For example, the operator technician can use the CRASH REPAIR BOX to run diagnostics on the hard drive of the local host computer, scan files for virus, download additional software to the local host computer in order to enhance performance/operations. In essence, once the local host computer is up and fully operational, there is no limit to the possible series of operations which may be performed by the technician at the remote computer location.

Once the technician has performed any further diagnostics, repairs, or enhancements, he will preferably then download an additional clean copy of the boot file directly to the user's local host computer, via the CRASH REPAIR BOX. In this way, the old boot file resident on the local host computer will now be replaced with a clean and fully tested/operational copy of the boot file. The technician will then reconfigure the CMOS setup in the local host computer to once again boot from the local hard drive resident within the local host computer. After reconfiguring the CMOS setup, the local computer will once again reboot, this time attempting to complete BOOT operations from the local hard drive. If all goes well, the BOOT operations are completed successfully and the user's computer is up and running with a new and clean boot file.

Once the service call has been completed and the user's local host computer is up and fully operational. The remote computer and technician will release control of the peripheral devices back to the local host computer and the technician will instruct the user that he/she may deactivate the CRASH REPAIR BOX of the present invention.

While the description above contains many specifics, it should not be construed as a limitation on the scope of the invention, but rather as an illustration of exemplifications of particular embodiments thereof One of ordinary skill in the art may make many changes, modifications, and substitutions without necessarily departing from the spirit and scope of the invention. Accordingly, the scope of the invention should be determined not by the embodiments described above, but by the appended claims and their legal equivalents.

What is claimed is:

1. A maintenance device for remotely accessing and repairing failed computer systems, the maintenance device comprising:
   a. an internal functional operations comprising a Broadcom capability means, a network card, an auto dialer, a VOIP means, a button, a memory, a memory controller, a microphone, and a speaker, the auto dialer configured to dial a specific remote IP address, the VOIP means initiated by the button and operationally connected to a speaker from which a user may hear a responding technician's communications and a microphone through which a user may communicate with a responding technician, the memory also storing a custom programmed user platform matching that of the failed computer's user platform, the memory controller controlling read/write operations to and from the memory, the microphone operationally connected to the internal functional operations, and the speaker operationally connected to the internal functional operations;
   b. the custom programming of the user platform in the memory enabling the maintenance device to be compatible with multiple operating systems;
   c. the connection of the maintenance device to a computer system being external from a computer, and lying connectively between the computer and external accessories of a computer comprising a monitor, a keyboard, and a mouse of a computer, and enabling the maintenance device to be operationally capturing information passing between the computer and the external accessories, operationally controlling the computer and the external accessories by remote access, and operationally allowing the diagnosis and repair of the failed computer system;
   d. a housing retaining the internal functional operations, and having an USB cable, an area for a microphone, an area for a speaker, an area for a button connected to the VOIP means, and at least one port, the USB cable operatively connecting the internal functional operations to a USB port of a computer, the at least one port receiving the connection cord of an external computer accessory and operationally connecting the external computer accessory to the internal functional operations; and
   e. a power supply means.

2. The maintenance device for remotely accessing and repairing failed computer systems in accordance with claim 1, wherein the maintenance device becomes operational only when initiated by a user of the failed computer system through use of the button.

3. A maintenance device for remotely accessing and repairing failed computer systems, the maintenance device comprising:
   a. an internal functional operations comprising a Broadcom capability means, a network card, an auto dialer, a memory, a memory controller, the auto dialer configured to dial a specific remote IP address, the memory also storing a custom programmed user platform matching that of the failed computer's user platform, the memory controller controlling read/write operations to and from the memory;
   b. the custom programming of the user platform in the memory enabling the maintenance device to be compatible with multiple operating systems;
   c. the connection of the maintenance device to a computer system being external from a computer and lying connectively between the computer and external accessories of a computer comprising a monitor, a keyboard, and a mouse of a computer, and enabling the maintenance device to be operationally capturing information passing between the computer and the external accessories, operationally controlling the computer and the external accessories by remote access, and operationally allowing the diagnosis and repair of the failed computer system;
   d. a housing retaining the internal functional operations, and having a USB cable, an area for a button connected to a VOIP feature, and at least one port, the USB cable operatively connecting the internal functional operations to a USB port of a computer, the at least one port receiving the connection cord of an external computer accessory and operationally connecting the external computer accessory to the internal functional operations; and
   e. a power supply means.

4. The maintenance device for remotely accessing and repairing failed computer systems in accordance with claim 3, wherein the maintenance device has a button operatively connected to the internal functional operations and through which the maintenance device becomes operational only when initiated by a user of the failed computer system through use of the button.

5. The maintenance device for remotely accessing and repairing failed computer systems in accordance with claim 3, wherein the internal functional operations include a VOIP means, a speaker, and a microphone, the VOIP means initiated by the button and operationally connected to the speaker from which a user may hear a responding technician's communications and to the microphone through which a user may communicate with a responding technician, the microphone operationally connected to the internal functional operations, and the speaker operationally connected to the internal functional operations.

6. A maintenance device for remotely accessing and repairing failed computer systems, the maintenance device comprising:
   a. an internal functional operations comprising a Broadcom capability means, a network card, an auto dialer, a memory, a memory controller, the auto dialer configured to dial a specific remote IP address, the memory also storing a user platform matching that of the failed computer's user platform, the memory controller controlling read/write operations to and from the memory;
   b. the connection of the maintenance device to a computer system being external from a computer, and lying connectively between the computer and external accessories of a computer comprising a monitor, a keyboard, and a mouse of a computer, and enabling the maintenance device to be operationally capturing information passing between the computer and the external accessories, operationally controlling the computer and the external accessories by remote access, and operationally allowing the diagnosis and repair of the failed computer system;

c. a housing retaining the internal functional operations, and having a USB cable, an area for a button connected to a VOIP feature, and at least one port, the USB cable operatively connecting the internal functional operations to a USB port of a computer, the at least one port receiving the connection cord of an external computer accessory and operationally connecting the external computer accessory to the internal functional operations; and d. a power supply means.

7. The maintenance device for remotely accessing and repairing failed computer systems in accordance with claim 6, wherein the maintenance device has a button operatively connected to the internal functional operations and through which the maintenance device becomes operational only when initiated by a user of the failed computer system through use of the button.

8. The maintenance device for remotely accessing and repairing failed computer systems in accordance with claim 6, wherein the internal functional operations include a VOIP means, a speaker, and a microphone, the VOIP means initiated by the button and operationally connected to the speaker from which a user may hear a responding technician's communications and to the microphone through which a user may communicate with a responding technician, the microphone operationally connected to the internal functional operations, and the speaker operationally connected to the internal functional operations.

9. The maintenance device for remotely accessing and repairing failed computer systems in accordance with claim 6, wherein the memory is not programmed with a specific user platform until purchase during which or after which the memory is custom programmed with a user platform to match the user platform of the failed computer and enabling the maintenance device to be compatible with multiple operating systems.

* * * * *